June 4, 1968  W. R. STEINACKER  3,386,181
METHOD OF REMOVING WATER AND APPARATUS THEREFOR
Filed Nov. 15, 1966

INVENTOR
WARREN R. STEINACKER

BY *Robert E. Patridge*

ATTORNEY

United States Patent Office 3,386,181
Patented June 4, 1968

3,386,181
METHOD OF REMOVING WATER AND
APPARATUS THEREFOR
Warren R. Steinacker, Wilmington, Del., assignor to E. I. du Pont de Nemours and Company, Wilmington, Del., a corporation of Delaware
Filed Nov. 15, 1966, Ser. No. 594,606
11 Claims. (Cl. 34—9)

ABSTRACT OF THE DISCLOSURE

A continuous method of removing water from the surface of non-absorbent articles by immersing them in a bath containing as its principal component a water-immiscible solvent which does not form an azetrope containing more than about 4% water or boiling more than about 8° C. below the boiling point of the solvent in which water is removed from the bath other than by vaporization. An apparatus for the removal of water comprising a sump containing a substantially vertical baffle which assists in removing water from the sump.

BACKGROUND OF THE INVENTION

Figure 1:
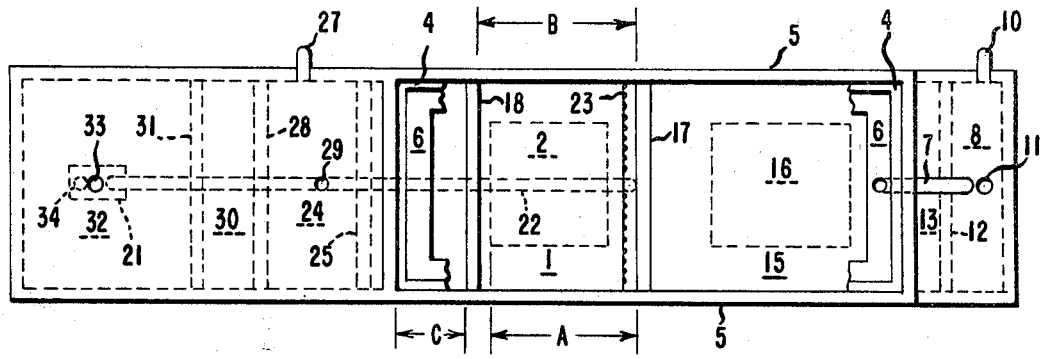

The oldest and simplest method of drying water-wet articles is by evaporative drying. However, this method is unsuitable for drying many articles. Articles made from important metals such as ferrous metals rust or corrode when water is allowed to evaporate from their surface in the presence of air. Evaporative drying of decorative articles leaves objectionable water spots resulting from the deposition of water-soluble soil as the water evaporates. Since many water-soluble soils are electrolytes, water spots are especially undesirable in the case of electrical and electronic equipment because of the resulting electrical conductivity and induced voltaic effects.

Newer and more sophisticated means are known for removing water. However, these methods still involve the evaporative removal of water to some extent and thus do not completely eliminate the disadvantages associated with simple evaporative drying. One of the best processes now in commercial use involves the immersion of water-wet articles in a boiling bath containing trichloroethylene and a surfactant. Water is immiscible in the bath solution and is continuously removed with trichloroethylene as a two-phase azeotrope containing about 7% water. As water is removed, water-soluble soils carried into the bath by the water-contaminated articles become increasingly more concentrated in the bath since no method is provided for their removal. Because of the relatively high water content of the azeotrope and the fact that it boils at a temperature substantially below the boiling point of the solvent, water is removed rapidly from the bath, in fact so rapidly that some of it evaporates directly from the surface of the article leaving behind a deposit of water-soluble soils. Many water-soluble soils, especially salts such as sodium chloride, are insoluble in trichloroethylene and, therefore, are not removed from the article on rinsing in pure boiling trichloroethylene.

Recently, improved compositions for water removal were disclosed by Burt and Phillips in U.S. application Ser. No 534,427, filed Mar. 15, 1966. These compositions contain 1,1,2-trichloro-1,2,2-trifluoroethane as the solvent and alkyl phosphate ester neutralized with saturated aliphatic amine as the surfactant. Such compositions are superior to the trichloroethylene compositions of the prior art when used to remove water in a batch operation. When a water-wet article is immersed in a boiling bath containing trichlorotrifluoroethane, evaporation of water directly from the surface of the article is of no significance since trichlorotrifluoroethane forms an azeotrope which contains only about 1% water and boils only about 3° C. below the boiling point of the solvent. However, due to the low water content of this azeotrope, these compositions cannot be used in the continuous apparatus now in commercial use since water is not removed sufficiently fast by azeotrope formation to prevent a build-up of excess water in the bath. Accordingly, there is a need for a continuous process for removing water utilizing solvents which do not form azeotropes containing large amounts of water or boiling substantially below the boiling point of the solvent.

DESCRIPTION OF THE INVENTION

It has now been discovered that articles can be dewatered continuously using solvents which do not form azeotropes containing large amounts of water or boiling substantially below the boiling point of the solvent by the process which comprises (1) establishing a vigorously agitated bath containing as its principal component a water-immiscible, organic solvent which has a boiling point of about 20–60° C., has a density of at least about 1.1 at 20° C., and does not form an azeotrope containing more than about 4% by weight of water or boiling more than about 8° C. below the boiling point of the solvent, (2) maintaining in said bath a region of turbulence in which any water present is dispersed in the form of droplets and a region of quiescence in which any water present forms a water layer, (3) continuously introducing substantially water-free solvent into the bath in the region of turbulence at the rate of about 0.1 to 5 gallons per minute per foot of bath width, (4) continuously removing the water layer from the region of quiescence, (5) immersing a non-absorbent article having a water-contaminated surface into the bath in the region of turbulence for sufficient time to displace the water, and (6) removing the substantially water-free article from the bath.

In accordance with the process of this invention, solvents are used which do not form azeotropes containing large amounts of water or boiling substantially below the boiling point of the solvent. Accordingly evaporation of water directly from the surface of the articles does not take place to any significant extent. An important feature of this process is the maintenance of two distinct regions in the dewatering bath, the first being a region of turbulence in which the articles to be dewatered are immersed and the second being a region of quiescence from which water and dissolved soils are continuously withdrawn by removal of a water layer. Thus, the concentration of water and/or water-soluble soils in the bath does not increase during continuous operation of the process. The present invention also involves particular apparatus for use in carrying out the process of this invention in an economical manner.

The solvent used in accordance with this invention may be any water-immiscible, organic solvent which has a boiling point of about 20–60° C., has a density of at least about 1.1 at 20° C., and does not form an azeotrope containing more than about 4% by weight of water or boiling more than about 8° C. below the boiling point of the solvent. The term "water-immiscible solvent" is intended to include solvents in which water is not more than about 0.1% by weight soluble. Preferably the solvent has a boiling point of about 35–50° C., a density of at least about 1.3 at 20° C. and does not form an azerotrope containing more than about 2% by weight of water or boiling more than about 4° C. below the boiling point of the solvent. Suitable solvents include trichloromonofluoromethane, 1,1,1-trichloro-2,2,2-trifluoroethane, 1,1,2-trichloro-1,2,2-trifluoroethane, methylene chloride and mixtures of the latter two.

Although it is not required in all applications, the solvent generally contains a surfactant which aids in the displacement of water from the surface of the articles. Preferably the surfactant is more soluble in the solvent than in water, and most preferably the surfactant is essentially insoluble in water. Any solvent-soluble surfactant which facilitates displacement of water by the solvent may be used. Suitable surfactants include long chain alkyl trimethyl ammonium chlorides and bromides such as cetyl trimethyl ammonium bromide, long chain alkyl pyridinum chlorides and bromides, di-long chain-alkyl dimethyl ammonium chlorides and bromides, long chain alkyl dimethyl benzyl ammonium chlorides, and alkyl phosphate esters neutralized with saturated aliphatic amines.

The preferred surfactants are the alkyl phosphate esters neutralized with saturated aliphatic amines disclosed in the above mentioned Burt and Phillips application. These surfactants are derived from alkyl phosphate esters selected from the class consisting of monoalkyl and dialkyl phosphate esters and mixtures thereof in which the alkyl groups contain 6 to 20 carbons, and saturated aliphatic amines containing 1 to 3 alkyl groups attached to the amine nitrogen and a total of 6 to 20 carbons.

The phosphate monoesters which are used to prepare the preferred surfactants are those having the structure

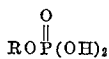

wherein R is an alkyl group containing from 6 to 20 carbons. The exact nature of the alkyl group is not critical so long as it contains the specified number of carbons. It may be straight chained such as hexyl, octyl, decyl, dodecyl, tridecyl, tetradecyl, hexadecyl, or octadecyl, or branch chained such as isooctyl, 2-ethylhexyl, isodecyl, tert-dodecyl or the mixed alkyl groups derived from branch chained alcohol mixtures formed in the oxo process and known in the art as "oxo-alkyl" groups. The dialkyl phosphates which may be used are those having the structure

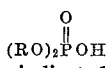

wherein R is the same as indicated above.

The saturated aliphatic amines which are used to prepare the preferred surfactants are those having the structures R'N(R'')$_2$ wherein R' is an alkyl group and each R'' is hydrogen or an alkyl group. R' and the two R'' groups together must contain a total of 6 to 20 carbons. Thus, the amine may be a primary amine such as hexylamine, octylamine, 2-ethylhexylamine, 1,1,3,3-tetramethylbutylamine, decylamine, dodecylamine, tetradecylamine, hexadecylamine or octadecylamine, a secondary amine such as ethylbutylamine, dipropylamine, dodecylmethylamine, tetradecylmethylamine, dioctylamine or octadecylmethylamine, or a tertiary amine such as triethylamine, decyldimethylamine, tributylamine, diethyloctylamine, tetradecyldimethylamine, hexadecyldimethylamine, decyldibutylamine, or octadecyldimethylamine. Mixture of amines, as are often available commercially, may also be used.

The amount of amine used to prepare the preferred surfactants should be at least sufficient to substantially neutralize the phosphate ester, and should not exceed about a 10% excess over the amount necessary to completely neutralize the phosphate ester. In general, about one mole of amine per mole of phosphate ester is required to neutralize the phosphate ester since the second hydrogen in the monoalkyl phosphate is not reactive with the amine. Neutralization of substantially all of the reactive hydrogens in the phosphate ester is important since residues of unneutralized phosphate ester are difficult to remove from the surface of the articles.

The most preferred surfactants are those derived from mixtures of mono-oxo-octyl and di-oxo-octyl phosphates neutralized with 2-ethylhexylamine, mixtures of mono(tridecyl) and bis(tridecyl) phosphates neutralized with 2-ethylhexylamine, and mixtures of mono- and di-n-octyl and mono- and di-n-decyl phosphates neutralized with 2-ethylhexylamine.

When surfactant is used, the amount may vary from about 0.001 to 10% by weight of the solvent solution, depending on the particular solvent and the articles being dried. Many plastic articles such as polyethylene and fluorinated polymers such as polytetrafluoroethylene which are not easily wetted by water can be dewatered without the use of a surfactant. When using the preferred water removal composition containing trichlorotrifluoroethane as solvent and alkyl phosphate ester neutralized with saturated aliphatic amine as surfactant, about 0.05 to 3% by weight of surfactant is preferred.

Suitable surfaces from which water can be removed in accordance with this invention are not limited to any particular material, but may be composed of any dimensionally stable, non-absorbent, insoluble, solid substance which may be used in manufacturing shaped articles. Typical examples of suitable metals include ferrous metals, nickel and its alloys, chromium and its alloys, stainless steels, copper, brass, bronze, silver, aluminum, zinc, cadmium, magnesium and the like. Naturally, highly reactive metals such as the alkali metals are not contemplated. Other surfaces which may be treated for water removal include glass and plastics such as nylon, polyethylene, polycarbonate, polytetrafluoroethylene, and the like.

The water to be removed from the surface of the articles may be in the form of a thin film, droplets of various sizes or in some cases water held by capillary attraction. The water may be substantially pure or it may contain dissolved materials such as minerals, salt, detergent or soap.

The process of this invention requires that the dewatering bath be vigorously agitated. The function of the agitation is two-fold. It is required to assist in efficiently displacing the water on the surface of the articles and is also necessary for maintaining the region of turbulence and the region of quiescence. By "vigorously agitated bath" is meant a bath which is electrically heated to boiling at the rate of at least about 5 watts per square inch of surface area in the region of turbulence or the equivalent amount of mechanical agitation. Preferably the bath is agitated at the rate of at least about 10 watts per square inch or the equivalent thereof.

Substantially water-free solvent is continuously introduced into the bath in the region of turbulence at the rate of about 0.1 to 5 gallons per minute per foot of bath width. By "bath width" is meant the dimension of the bath which is perpendicular to the flow of liquid. Preferably the solvent is introduced at the rate of 1 to 2 gallons per minute per foot of bath width. By "substantially water-free solvent" is meant solvent containing no immiscible water phase. Thus, the amount of water present in the solvent introduced into the region of turbulence is limited to not more than about 0.1% by weight as indicated by the definition of "water-immiscible solvent."

The length of time during which the articles are immersed in the dewatering bath may vary over wide limits. The particular time chosen in any particular case will depend upon such factors as the configuration of the surface of the articles, the particular solvent and surfactant, the amount and kind of agitation, the rate of circulation of solvent through the bath, and the degree of water removal desired. In general, the immersion time will vary from about one second to above five minutes.

Figure 2:
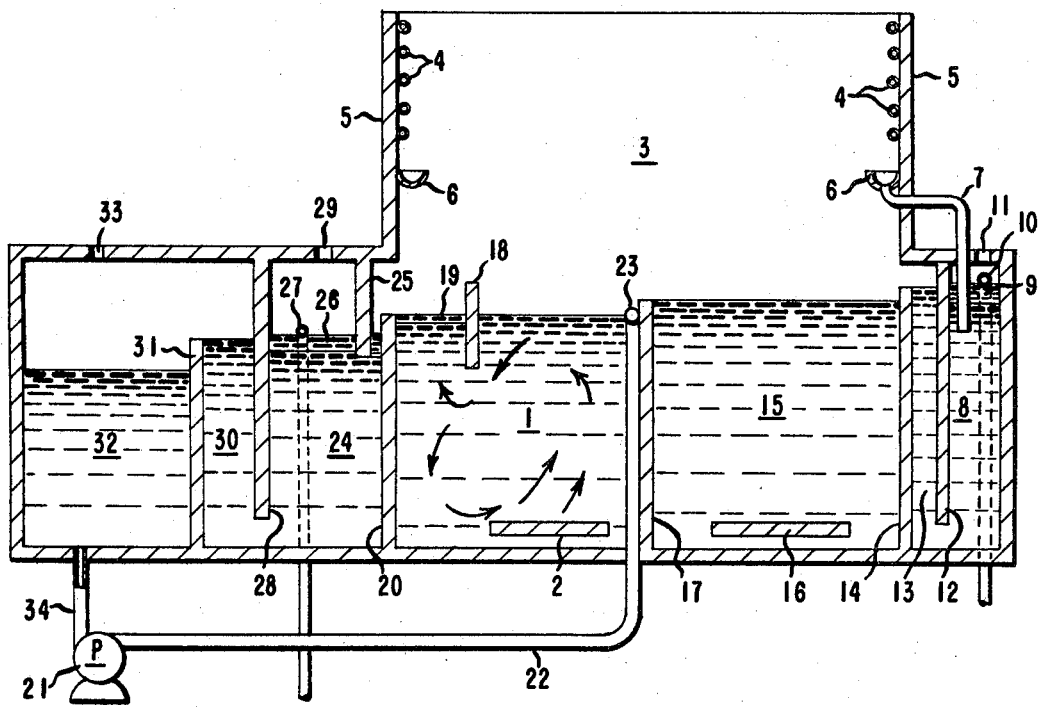

The novel process of this invention is most readily understood by reference to the accompanying drawing. In the drawing, FIGURES 1 and 2 diagrammatically illustrate apparatus suitable for use on one embodiment of the process of this invention. FIGURE 2 is a side elevation of the same apparatus.

Referring now to the drawing, articles to be dewatered are immersed in the bath containing solvent and surfactant in dewatering sump 1. The bath in sump 1 is heated to boiling by means of heater 2. This boiling serves several functions. It provides a convenient means of agitation which assists in the physical displacement of water from the surface of the articles. It also provides a convenient means of transferring distilled solvent from sump 1 to rinse sump 15. As the liquid boils, solvent vapors, and possibly some two phase azeotrope formed from water present in the bath, rise into vapor space 3 which is open to the atmosphere at the top.

The vapors from sump 1 are condensed by condenser coils 4 which are metal tubes through which a fluid, such as cold water, is flowing. The condenser coils surround the upper portions of walls 5 which encloses the vapor space above sumps 1 and 15. These coils may be on the vapor space side of the walls as illustrated in the drawing or they may be located inside walls 5. As the vapors condense, the condensate runs down walls 5 and is collected in channel 6. Condensate passes from channel 6 through pipe 7 into water separation compartment 8 of a water separator which also includes chamber 13.

The water separator serves to remove any water which may appear in the vapor phase either from the atmosphere or by codistillation of azeotropic amounts of water with the solvent. In water separation compartment 8 the condensate separates into a lower solvent phase and an upper water phase. Water layer 9 is drawn off from the water separator by means of overflow drainpipe 10. Pressure is equalized in compartment 8 through vent hole 11 which is open to the atmosphere. The substantially water-free solvent phase passes under partition wall or baffle 12 into chamber 13 and subsequently overflows partition wall or weir 14 into rinse sump 15.

The water separator for the condensate is illustrated in the drawing as an integral part of the overall apparatus. Optionally, this water separator can be a separate unit detached from the rest of the apparatus. In that case distilled solvent could be removed from chamber 13 of the water separator via an overflow drainpipe which is connected at the other end to sump 15. Preferably the solvent from chamber 13 is introduced near the bottom of sump 15 since better thermal distribution in the sump is achieved in this manner.

Since the surfactant used in sump 1 is non-volatile, it is not present in the condensate being introduced into sump 15. Thus, except for the small amount of surfactant carried into sump 15 with the articles, and possibly an extremely small amount of water, not exceeding the solubility of water in the solvent, the liquid in sump 15 is substantially pure solvent.

Positioned near the bottom of sump 15 is heater 16 which is used to boil the solvent. Heating rinse sump 15 to boiling has several advantages. It provides agitation which assists in displacing from the surface of the article the surfactant carried over from sump 1. Boiling the rinse sump also prevents condensation of water vapor from vapor space 3 on the liquid surface.

Excess solvent from sump 15 continuously overflows partition wall or weir 17 into dewatering sump 1 at a rate substantially equal to the rate at which solvent evaporates from sump 1. Substantially water-free solvent containing surfactant is continuously circulated to sump 1 by means of sump 21 via pipe 22 and distributor pipe 23. Distributor pipe 23 contains a plurality of holes which introduce the circulating liquid in an evenly distributed stream away from weir 17, thus eliminating the possibility of stagnant puddles of water on the surface of the solvent between partition wall 17 and baffle 18.

Various other means for delivering an evenly distributed stream of solvent solution from pump 21 are operable. For example, the stream could be introduced through an interstitial space formed by replacing partition wall 17 with two parallel partition walls, the upstream wall being the height of wall 17 and the downstream wall being the height of weir 20. Although it is preferred that the circulating liquid be introduced in an evenly distributed stream away from weir 17, it is not essential that it be introduced in this manner. Any method of introduction, including an open pipe, could be used.

Due to the continuous introduction of liquid into sump 1 through distributor pipe 23, the liquid from sump 1 continuously overflows partition wall or weir 20 into water separation compartment 24 of a phase separation type water separator which also includes chamber 30. This net overflow, ignoring small evaporation losses through the opening above vapor space 3, is equal to the pumping rate of pump 21.

One of the critical features of the apparatus of this invention is baffle 18 which is a substantially vertical baffle extending across the width of sump 1. Baffle 18 is positioned such that the distance from the baffle to weir 20 (designated C in FIGURE 1) is about 5–100% of the distance from partition wall 17 to the baffle (designated B). Preferably the distance from the baffle to weir 20 is about 10–25% of the distance from partition wall 17 to the baffle. In the vertical plane, the baffle extends above and below the top of weir 20, the distance from the horizontal level of the top of weir 20 to the bottom of the baffle being about 0.1–50% of the distance from the horizontal level of the top of weir 20 to the bottom of sump 1. Preferably the distance from the top of weir 20 to the bottom of the baffle is about 2–35% of the distance from the top of weir 20 to the bottom of the sump.

With the installation of baffle 18 in accordance with this invention, water is quickly removed from the sump as it is introduced with the articles being dried. Although the exact mechanism by which the baffle operates is not thoroughly understood, it has been found that this baffle is extremely effective in isolating water present in the sump in the area between baffle 18 and weir 20.

The water removed from the articles in sump 1 is under vigorous agitation due to boiling and is thereby dispersed in the form of droplets. During boiling vapor bubbles rise from heater 2 and the entire liquid content of the sump, including the water droplets, circulates following the pattern indicated by the arrows in FIGURE 2. Quite surprisingly, the circulation is always in this direction so long as heater 2 is positioned such that the distance from partition wall 17 to the far side of heater 2 (designated A) is not greater than the distance from partition wall 17 to baffle 18 (designated B). Following this flow pattern, liquid passing under baffle 18 passes from a region of turbulence into a region of quiescence in which turbulence is sufficiently diminished that the solvent and water phases separate, and because of the relative densities of the phases, water layer 19 forms at the surface of the liquid in the quiescent zone.

If the apparatus were operated with baffle 18 not in place, then the liquid overflowing weir 20 would contain water, in the form of droplets, in a concentration approximately equal to the average concentration existing in the whole of sump 1. Indeed, without baffle 18 to increase the proportion of water in the mixture overflowing weir 20, the illustrated apparatus would be impractical.

Another critical feature of the apparatus of this invention is the location of heater 2. The heater should be positioned near the bottom of the sump on the inlet side of the baffle. In the vertical plane, the heater may be positioned within the bath as illustrated in FIGURE 2 or it may be just below the bottom of the sump such that heat is conducted into the bath through the bottom of the sump. In the horizontal plane, the heater should be positioned such that the distance from partition wall 17 to the far side of the heater (designated A) is not greater than the distance from partition wall 17 to baffle 18 (designated B). Preferably the ratio of these distances, that is $A/B$, is in the range from about 0.75 to about 0.95.

To provide the necessary degree of agitation, heater 2 is electrically operated at a rating of at least about 5 watts per square inch of surface area in the region of turbulence between baffle 18 and partition wall 17, and preferably about 10 watts per square inch. The upper limit on the rating of the heater, which depends upon the capacity of condenser coils 4 to condense the vapors evolved, preferably should not exceed about 40 watts per square inch.

The continuous introduction of fluid into sump 1 results in the continuous overflowing of a portion of water layer 19 and adjacent solvent over weir 20 such that water layer 19 remains rather small at all times. Although a distinct water layer is illustrated in FIGURE 2, water layer 19 is actually in a transient state and does not form a coherent layer as shown except for a few seconds after a wet article is placed in sump 1. Baffle 25 acts as a vapor trap which prevents the passage of vapor from vapor space 3 into the water separator.

The outlet means from sump 1 is, of course, not limited to overflowing weir 20, although this is a convenient method of removing water layer 19. Other suitable means will occur to those skilled in the art such as an overflow drainpipe or a suction line.

As the water overflowing weir 20 enters water separation compartment 24, it passes under baffle 25 and rises to form water layer 26 at the top of the liquid. The rising of the water to the top is rapid enough that all the water is retained in compartment 24. The opening into drainpipe 27 is positioned just above the horizontal level of the top of partition wall or weir 31.

If there were no water in the system, the liquid levels on both sides of partition wall or baffle 28 in the water separator would equilibrate at essentially the same height. However, due to the presence of water layer 26 on the upstream side of baffle 28, the average density of the liquid in compartment 24 is less than it is in chamber 30, with the result that the liquid level in compartment 24 rises above the level in chamber 30.

When the liquid in compartment 24 reaches the level of drainpipe 27, water flows out and is removed from the apparatus. Thus, the thickness of water layer 26, which is not critical to the operation of the apparatus, is determined by the horizontal position of water drainpipe 27 and the slight pressure drop under baffle 28. The gas pressure in compartment 24 is equalized through vent hole 29.

Substantially water-free solvent solution passes under baffle 28 into chamber 30 and overflows weir 31 into hold tank 32. Above hold tank 32 is vent hole 33 which provides gas pressure equalization in the hold tank. Optionally vent holes 33, 29 and 11 may be connected via a pipe to vapor space 3 at a point near the top of condenser coils 4 to minimize vapor phase loss of solvent. The solvent is continuously removed from hold tank 32 via pipe 34 and recirculated to sump 1 by means of pump 21, thus completing the cycle of circulating solvent and surfactant.

The apparatus is prepared for use in the preferred embodiment of the process by filling sump 15 to the top of partition wall 17 and water separation compartment 8 and chamber 13 to the top of partition wall 14 with pure solvent. Sump 1, water separation compartment 24 and hold tank 32 are filled with a solvent-surfactant mixture. Sump 1 and water separation compartment 24 are filled to overflowing, that is, until the liquid overflows weirs 20 and 31. Hold tank 32 is filled to a level such that the additional volume which would be required to fill it to the top of partition wall 31 is at least equal to the maximum volume of articles present in sumps 1 and 15 at any one time. Water should be added to water separation compartments 8 and 24 to provide initial water layers 9 and 26 which minimize the escape of solvent vapors through drainpipes 10 and 27.

Operation of the apparatus is begun by flowing fluid through condenser coils 4, turning on heaters 2 and 16 and beginning pump 21. The liquid level in hold tank 32 varies during operation of the apparatus. It rises when work is introduced into the system, and falls when the work is removed. Losses of solvent due to evaporation and dragout on articles are reflected in a lowering of the liquid level in hold tank 32. Make-up solution containing solvent and surfactant is conveniently added to sump 1. The amount of surfactant in the make-up solution should be adjusted to replace any surfactant lost via pipeline 27 because of its solubility in the water phase.

Articles to be dried are immersed in the bath in sump 1 where water is displaced from their surface. If at this point the articles were lifted from the bath and allowed to dry, they would, although substantially free of water, show traces of the surfactant on their surfaces. If it is desired to remove the surfactant from the articles, as is usually the case, the articles are rinsed in sump 15 which, as noted above, is substantially free of surfactant. On removal from the rinse sump, the articles dry quickly in air to a thoroughly clean and water-free state.

In addition to the optional variations in the apparatus discussed above, other variations are possible which relate to the operation of the process itself. For example, in certain applications it may be desirable to operate the process without the use of any rinsing after the articles are removed from dewatering sump 1. In the case of many plastic articles, such as polyethylene and fluorinated polymers, the use of a surfactant in sump 1 is not necessary, and thus the function of rinse sump 15, namely to remove surfactant, is not needed. On the other hand, in the case of ferrous metals, it is preferable to use an alkyl phosphate ester neutralized with saturated aliphatic amine as the surfactant and in some applications it is desirable to leave the surfactant on the surface of the metal to impart rust inhibiting properties. In this case also, rinsing is undesirable.

When the rinse sump is not used, the apparatus can be considerably simplified since it is no longer necessary to boil the solvent in sump 1 to provide distilled solvent for the rinse sump. Accordingly, not only sump 15 but also vapor space 3, condenser coils 4, walls 5, channel 6, pipe 7 and the entire water separator for the condensate can be eliminated. The agitation required to assist in the displacement of water in sump 1 can be provided by mechanical means such as a submersible liquid pump, a paddle or propeller type stirrer, sparging a gas into the bottom of the sump or vigorously shaking the articles. When a choice of direction of flow is present, such as in the case of a propeller or a pump, the agitation means should be positioned so as to cause the liquid flow to follow as closely as possible the pattern indicated in FIGURE 2.

In some applications it may be desirable to provide additional rinsing of the articles after they are removed from the rinse bath in sump 15. By not heating the solvent in rinse sump 15 to boiling, it is possible to vapor rinse the articles in vapor space 3 as they are removed from the rinse sump. This is accomplished either by not heating the solvent in the rinse sump at all, or by only partially heating the solvent to a temperature significantly below its boiling point. When the solvent is not heated at all, it is preferable to substitute mechanical agitation means for heater 16 to assist in the rinsing process. Suitable mechanical means of agitation include paddle and propeller stirrer, submersible pumps, ultrasonic agitation, shaking the articles and the like. In any event, when the articles are removed from the rinse sump, they are at a temperature significantly below the temperature of the vapors in vapor space 3. As the articles pass through vapor space 3, solvent vapors condense on them giving them a vapor rinse.

Except in the case of ferrous and other metals which are rusted or corroded by water, the small azeotropic amount of water which may be present in vapor space 3 has no deleterious effect during the vapor rinse since this water is completely free of water-soluble soils. Moreover, a spray rinse could be substituted for the vapor rinse in the case of articles which are rusted or corroded by water. This could be accomplished by pumping substantially pure solvent from chamber 13 of the water separator through one or more spray heads mounted in vapor space 3 and passing the articles through the spray as they are withdrawn from the rinse sump.

Another means of providing an additional solvent rinse for the articles is to add a second rinse sump similar to sump 15. Such apparatus is constructed by interposing the second rinse sump between rinse sump 15 and chamber 13 of the water separator. The second rinse sump has a liquid level intermediate between the levels of the liquid in sump 15 and chamber 13. All three sumps are, of course, surrounded by condenser coils 4, walls 5 and channel 6. The second rinse sump is provided with a heater such as heater 16. Distilled solvent overflowing weir 14 of chamber 13 cascades through the two rinse sumps and then passes into sump 1.

The purpose of this additional rinse sump is to provide two rinse baths for the dewatered articles after they are removed from sump 1. When the articles are removed from the dewatering sump, they are wet with solvent solution, commonly called "dragout," which contains a small amount of surfactant. This surfactant is carried into the first rinse bath. After displacement and considerable dilution of such surfactant in the first rinse bath, the dragout from the first rinse bath to the second rinse bath will not contain any significant amount of surfactant. Thus, the use of a second rinse bath guarantees a final rinse in essentially pure solvent, even where rather large amounts of dragout are encountered.

Although the use of baffle 18 provides an economical and efficient apparatus for the process of this invention, it is possible to carry out the process without the use of this baffle provided other modifications are made in the apparatus. For example, the maintenance of a region of turbulence and a region of quiescence in the dewatering sump could be accomplished without a baffle by expanding the length of sump 1 in the direction away from heater 2 until dimension A is only a small fraction of the total length of the sump.

The following examples, illustrating the novel process and apparatus disclosed herein, are given without any intention that the invention be limited thereto.

Example 1

This example is a simple illustration of the baffle principle of the present invention. A one liter glass beaker was filled approximately one-third full with a 1,1,2-trichloro-1,2,2-trifluoroethane solution containing 0.5 percent by weight of an equimolar mixture of mono- and di-oxo-octyl phosphates neutralized with 2-ethylhexylamine as surfactant. The beaker was placed on an electric hot plate and a loosely fitting water-cooled condenser coil consisting of three turns of ¼" stainless steel tubing was suspended inside the top third of the beaker.

Twenty-five milliliters of water, colored with food color for easier observation, was added to the solution in the beaker and the mixture was refluxed. At a moderately vigorous boiling rate, the water was dispersed evenly throughout the solution in the form of droplets. It was noted that all ebullition occurred within a circle about one inch inward from the walls of the beaker.

The mixture was cooled and a vertical baffle consisting of four thicknesses of aluminum foil was installed in the beaker. The baffle, which was about one-fourth the inner circumference of the beaker in length, formed an arc about one inch inward from the wall of the beaker and extended about one inch below the surface of the liquid. After bringing the contents of the beaker again to a moderately vigorous boil, in less than about one minute most of the water had collected in the area between the foil and the adjacent beaker wall. This example was repeated a number of times with the same result.

Example 2

This example illustrates the criticality of the baffle in the dewatering sump. Apparatus similar to that illustrated in the drawing was constructed from ¼ inch thick polymethylmethacrylate sheets. The dimension of sump 1 were approximately 6 x 6 inches square and 12 inches deep. Weir 20 fixed the liquid depth in sump 1 at 6 inches. The dewatering sump was charged with the same solvent-surfactant solution as was used in Example 1. Baffle 18 was positioned about two inches below the surface of the liquid. Heat sufficient to vigorously boil the mixture was provided by a coil type electric immersion heater placed near the bottom of the sump about one-third of the way from partition wall 17 to weir 20. With pump 21 turned on, it was found that water was substantially completely removed from water-wet electrical components having polished metal surfaces and swept from sump 1 in less than a minute. For easier observation, the water used to wet the articles was tinted with food color.

When the experiment was repeated without the baffle in place, water was removed from the dewatering sump only slowly as the pump made an asymptotic approach to the no-water condition. The concentration of water droplets in the stream overflowing weir 20 appeared at all times to be about the same as the average concentration of water in the dewatering bath.

Example 3

This example illustrates the criticality of the position of the heater in the dewatering sump. For use in the following experiments, apparatus similar to that illustrated in the drawing was made from ¼ inch thick sheets of polymethylmethacrylate.

Heater 2 consisted of a combination of three 250-watt coil type heaters arranged roughly in the form of a rectangle. Dimension A, which as illustrated in FIGURE 1 is the distance from partition wall 17 to the far edge of the combined heaters 2, was varied in the experiments. Dimension B, which is the distance from partition wall 17 to baffle 18, was fixed at 5.8 inches. The position of combined heaters 2 was defined as a fraction of the distance from wall 17 to baffle 18, or $A/B$. For example, when $A/B$ has a value of one, the downstream edge of the heaters is directly under the upstream edge of the baffle.

The inside dimensions of the dewatering sump were as follows. The height of weir 20 was 8 inches; the width of the sump was 6 inches, and the length of the sump was 7.8 inches. The baffle was parallel to weir 20 and extended ½ inch below the horizontal level of weir 20.

Experiments were carried out in the following manner. A solution of 0.5 wt. percent of the surfactant described in Example 1 in 1,1,2-trichloro-1,2,2-trifluoroethane was supplied to the dewatering sump at the rate of 0.6 gallon per minute per foot of sump width through a distributor pipe. With the heaters turned on and the bath under vigorous boiling, tinted water (100 ml.) was added to that portion of the dewatering sump upstream from the baffle and a stopwatch was started. After 15 seconds the heaters and the flow of solvent into the sump via the distributor pipe were stopped and the percentage of the original 100 ml. of water remaining in the sump on both sides of the baffle was estimated by comparison with the volume of known amounts of tinted water in the same bath. The experiment was then repeated except that the operation was allowed to run for 60 seconds before stopping and estimating the percentage of the original water remaining in the sump. The placement of the heaters was changed as indicated by the values of $A/B$ in Table I and the above procedure was repeated for each placement.

The results of these experiments are reported in Table I in terms of the percentage of the sample of water removed from the sump by overflowing weir 2.

TABLE I

| Heater Position, A/B | Percent Water Removed from the Sump | |
|---|---|---|
| | 15 Seconds | 60 Seconds |
| 0.35 | 60 | 95 |
| 0.60 | 50 | 90 |
| 0.86 | 35 | 80 |
| 1.1 | 10 | 20 |
| 1.2 | 5 | 10 |

Example 4

This example illustrates the criticality of the depth of the baffle in the dewatering sump and its relationship to the heat flux. Apparatus similar to that described in Example 3 was used except that the depth of the dewatering sump and the immersion of the baffle were varied. The lateral position of the baffle was held constant at 5.8 inches from wall 17, while the degree of baffle immersion, which is expressed in Table II as a percent of the sump depth, was systematically varied. Liquid was introduced into the dewatering sump through the distributor pipe at the rate of 0.6 gallon per minute per foot of sump width. The position of the heaters gave an $A/B$ value of 0.7. The amount of heat flux was varied as indicated in Table II wherein the watts per square inch are based on the surface area between the baffle and wall 17. Except as noted above, experiments were carried out in the same manner as Example 3 using the same solvent and surfactant.

The conditions and results of the experiments are in the following table.

TABLE II

| Sump Depth, inches | Heat Flux, watts/sq. in. | Baffle Depth, percent of sump depth | Percent Water Removed, 15 sec. |
|---|---|---|---|
| 4 | 27.8 | 62 | 50 |
| 4 | 27.8 | 37 | 95 |
| 4 | 27.8 | 13 | 99 |
| 8 | 20.8 | 62 | 35 |
| 8 | 20.8 | 31 | 80 |
| 8 | 20.8 | 19 | 85 |
| 8 | 20.8 | 6 | 95 |
| 8 | 27.8 | 62 | 60 |
| 8 | 27.8 | 31 | 85 |
| 8 | 27.8 | 19 | 90 |
| 8 | 27.8 | 5 | 98 |
| 16 | 20.8 | 62 | 20 |
| 16 | 20.8 | 32 | 95 |
| 16 | 20.8 | 19 | 97 |
| 16 | 20.8 | 6 | 90 |
| 16 | 27.8 | 62 | 29 |
| 16 | 27.8 | 32 | 93 |
| 16 | 27.8 | 19 | 85 |
| 16 | 27.8 | 6 | 85 |
| 16 | 33.3 | 62 | 35 |
| 16 | 33.3 | 32 | 90 |
| 16 | 33.3 | 19 | 97 |
| 16 | 33.3 | 7 | 95 |

Example 5

This example illustrates the use of various solvents. Experiments were carried out in stainless steel apparatus similar to that illustrated in the drawing. The dewatering sump was 12 inches long, 6 inches wide and 6 inches deep. A baffle extended downward one-half inch into the liquid and was positioned 8.3 inches from wall 17. The heat flux was 15 watts per square inch of surface area upstream from the baffle and the value of $A/B$ was approximately 0.9. The heat flux passed through the metallic bottom of the sump from heaters placed outside the pump proper. The volume of circulating solvent was 1.2 gallons per minute per foot of sump width.

The sump was filled successively with the solvents shown in Table III. Tinted water (100 ml.) was added in the area between the baffle and wall 17. The comparative efficiency of the various solvents in removing the water from the sump was estimated by noting the proportion of the water removed from the bath in one minute in the same manner as described in Example 3.

The results are given in the following table which also includes known physical constants for the various solvents.

TABLE III

| Name | Physical Constants For Solvent | | | Azeotrope | | Result, |
|---|---|---|---|---|---|---|
|  | Boiling Point, °C. | Density, g./cc. | Solubility of Water, wt. percent | Water Content, wt. percent | Boiling Point, °C. | Percent Water Removed, 1 min. |
| 1,1,2-trichloro-1,2,2-trifluoroethane | 47.6 | 1.56 | 0.01 | [1] 1.0 | 44.5 | 95 |
| Methylene chloride | 39.8 | 1.32 | 0.17 | [1] 1.0 | 38.8 | 85 |
| Azeotropic Mixture: 50.5 wt. percent 1,1,2-trichloro-1,2,2-trifluoroethane and 49.5 wt. percent methylene chloride | 36.5 | 1.42 | 0.09 | [1] 0.7 | [1] 34 | 98 |

[1] Approximate.

Example 6

This example illustrates continuous operation of the process and apparatus of this invention. The apparatus used was similar to that shown in the drawing except that it contained an unheated third sump upstream from sump 15. Each of the sumps were 14 inches square and 12 inches deep. Baffle 18 was mounted 2.25 inches upstream from weir 20 and extended 6 inches below the liquid surface. The value of $A/B$ was about 0.9, and the heat flux was adjusted to provide vigorous boiling. The solvent and surfactant was the same as indicated in Example 1. Solvent solution was circulated through the dewatering sump at the rate of 1.5 gallons per minute per foot of sump width.

The apparatus was operated ten hours per day, five days per week for twelve weeks, corresponding to 600 hours of operation. During this time, several million water-wet, small, polished metallic electrical components were passed through the sumps in the order: sump 1, sump 15, and then the cold rinse sump. The articles, contained in a wire basket, were held in sump 1 for two minutes, then passed rapidly through the two rinse sumps, briefly rinsed in vapor space 3 as they were removed from the cold sump, and allowed to dry in the air. All conponents treated in this manner were bright, and free of water and water spots.

After the 600 hours of continuous operation, there was no accumulation of water-soluble soils in the sumps, even though the parts introduced into sump 1 were wet with natural well water which contained dissolved mineral salts. At this point the bath was judged to be suitable for further drying, even though it had not been changed during the entire operation. Only small amounts of make-up 1,1,2-trichloro-1,2,2-trifluoroethane were required to replace solvent lost by evaporation and dragout on the parts.

As will be apparent to those skilled in the art, numerous modifications and variations of the embodiments illustrated above may be made without departing from the spirit of the invention or the scope of the following claims.

The embodiments of the invention in which an exclusive property or privilege is claimed are defined as follows:

1. A method of removing water from the surface of a non-absorbent article which comprises:
   (1) establishing a vigorously agitated bath containing as its principal component a water-immiscible, organic solvent which has a boiling point of 20–60° C., has a density of at least 1.1 at 20° C., and does not form an azeotrope containing more than 4% by weight of water or boiling more than 8° C. below the boiling point of the solvent,
   (2) maintaining in said bath a region of turbulence in which any water present is dispersed in the form of droplets and a region of quiescence in which any water present forms a water layer,
   (3) continuously introducing substantially water-free solvent into the bath in the region of turbulence at the rate of 0.1 to 5 gallons per minute per foot of bath width, (4) continuously removing the water layer from the region of quiescence, (5) immersing a non-absorbent article having a water-contaminated surface into the bath in the region of turbulence for sufficient time to displace the water and (6) removing the substantially water-free article from the bath.

2. The process of claim 1 in which the bath is vigorously agitated by electrically heating to boiling at the rate of at least 5 watts per square inch of surface area in the region of turbulence, the solvent has a boiling point of 35–50° C., has a density of at least 1.3 and does not form an azeotrope containing more than 2% water or boiling more than 4° C below the boiling point of the solvent, the region of turbulence and the region of quiescence are maintained by a baffle, and the substantially water-free solvent is introduced into the bath at the rate of 1–2 gallons per minute per foot of bath width.

3. The process of claim 2 in which the solvent is 1,1,2-trichloro-1,2,2-trifluoroethane and the bath is heated at the rate of 10–40 watts per square inch of surface area in the region of turbulence.

4. The process of claim 3 in which solvent vapors from the boiling bath are continuously condensed and passed to a rinse bath, excess solvent from the rinse bath is continuously passed to the boiling bath, a mixture of water and solvent is continuously removed from the region of quiescence and the immiscible phases are separated, the substantially water-free solvent phase is continuously introduced into the boiling bath in an evenly distributed stream toward the region of quiescence, the articles removed from the boiling bath are immersed in the rinse bath for a sufficient time to rinse them, and the rinsed articles are removed from the rinse bath.

5. The process of claim 4 in which the boiling bath contains 0.05–3% by weight of alkyl phosphate ester neutralized with saturated aliphatic amine as surfactant.

6. The process of claim 5 in which the surfactant is a mixture of mono-oxo-octyl and di-oxo-octyl phosphates neutralized with 2-ethylhexylamine.

7. Apparatus for the removal of water which comprises a dewatering sump containing a substantially vertical baffle extending across the sump, agitation means positioned near the bottom of the sump on one side of the baffle, an inlet to the sump on the same side of the baffle as the agitation means, an outlet from the sump on the other side of the baffle, said baffle being positioned, in the vertical plane, such that it extends above and below the horizontal level of the sump outlet, the distance from horizontal level of the sump outlet to the bottom the baffle being 0.1 to 50% of the distance from the horizontal level of the sump outlet to the bottom of the sump, and in the horizontal plane, such that the distance from the baffle to the sump wall opposite the outlet side of the baffle is 5 to 100% of the distance from the baffle to the sump wall opposite the inlet side of the baffle, said agitation means being positioned such that the distance from the sump wall opposite the inlet side of the baffle to the far side of the agitation means is not greater than the distance from the sump wall opposite the inlet side of the baffle to the baffle.

8. The apparatus of claim 7 in which the distance from the horizontal level of the sump outlet to the bottom of the baffle is 2–35% of the distance from the horizontal level of the sump outlet to the bottom of the sump, the distance from the baffle to the sump wall opposite the outlet side of the baffle is 10–25% of the distance from the baffle to the sump wall opposite the inlet side of the baffle, and the distance from the sump wall opposite the inlet side of the baffle to the far side of the agitation means is 0.75–0.95 times the distance from the sump wall opposite the inlet side of the baffle to the baffle.

9. The apparatus of claim 8 in which the agitation means is an electric heater, a rinse sump is located adjacent to the sump wall opposite the inlet side of the baffle, the space above the dewatering and rinse sumps is enclosed by a wall, the upper portions of the wall is surrounded by a condenser, means is provided for passing condensate from the wall into the rinse sump, means is provided for passing liquid from the rinse sump to the dewatering sump, the outlet from the dewatering sump is connected to a phase separator, and means is provided for passing the heavier phase from the phase separator through the inlet to the dewatering sump.

10. The apparatus of claim 8 in which an electric heater is positioned near the bottom of the rinse sump, the means for passing liquid from the rinse sump to the dewatering sump is a weir, the inlet to the dewatering sump is through a distributor pipe, and the outlet from the dewatering sump is a weir.

11. The apparatus of claim 10 in which a second rinse sump having an electric heater positioned near its bottom is located adjacent to the first rinse sump on the opposite side from the dewatering sump, the wall and condenser encloses the vapor space above all three sumps, the means provided for passing condensate from the wall into the rinse sump passes condensate to the second rinse sump only and a weir is provided for passing liquid from the second rinse sump to the first rinse sump.

References Cited
UNITED STATES PATENTS

| | | | |
|---|---|---|---|
| 2,503,913 | 4/1950 | Kimberlin et al. | 34—9 |
| 3,003,247 | 10/1961 | Sherliker | 34—9 |
| 3,005,266 | 10/1961 | Nicholaas van der Sanden et al. 34—9 |

FREDERICK L. MATTESON, JR., *Primary Examiner.*

J. J. CAMBY, *Assistant Examiner.*